United States Patent
Lee et al.

(10) Patent No.: US 7,158,812 B2
(45) Date of Patent: Jan. 2, 2007

(54) APPARATUS AND METHOD FOR MEASURING OUTPUT POWER OF PILOT CHANNEL AT CDMA BASE STATION

(75) Inventors: Sang Keun Lee, Seongnam (KR); Sang Kyun Kim, Seoul (KR)

(73) Assignees: MTI, Co., Ltd. (KR); Ktfreetel Co., Ltd. (KR)

(*) Notice: Subject to any disclaimer, the term of this patent is extended or adjusted under 35 U.S.C. 154(b) by 498 days.

(21) Appl. No.: 10/382,417

(22) Filed: Mar. 6, 2003

(65) Prior Publication Data

US 2003/0181220 A1  Sep. 25, 2003

(30) Foreign Application Priority Data

Mar. 25, 2002  (KR) ............ 10-2002-0016199

(51) Int. Cl.
*H04M 1/00* (2006.01)
*H04B 17/00* (2006.01)

(52) U.S. Cl. .................... 455/561; 455/226.1
(58) Field of Classification Search .......... 455/561, 455/226.1
See application file for complete search history.

(56) References Cited

U.S. PATENT DOCUMENTS 5,570,373 A * 10/1996 Wing .................. 455/423
5,687,171 A * 11/1997 Shin et al. ........... 370/335
6,744,754 B1 * 6/2004 Lee ..................... 370/342

FOREIGN PATENT DOCUMENTS

KR  010068238 A  7/2001

* cited by examiner

Primary Examiner—William J. Deane, Jr.
(74) Attorney, Agent, or Firm—Keusey, Tutunjian & Bitetto, P.C.

(57) ABSTRACT

Disclosed is an apparatus and method for measuring output power of a pilot channel transmitted from a CDMA (code division multiple access) base station. The method for measuring transmission output power of the base station in a forward link from the CDMA base station to at least one mobile station, includes receiving output power of the base station, measuring the total output power outputted from the base station by means of an output power level measurement unit and at the same time dividing and measuring the output power of the base station in the same time zone according to each code by means of a code domain analyzer, evaluating a proportion which the pilot channel accounts for with respect to all code domains, and evaluating only output power of the pilot channel by multiplying the proportion of the pilot channel by the total output power of the base station.

3 Claims, 5 Drawing Sheets

APPARATUS AND METHOD FOR MEASURING OUTPUT POWER OF PILOT CHANNEL AT CDMA BASE STATION

BACKGROUND OF THE INVENTION

1. Field of the Invention

The present invention relates to an apparatus and method for measuring transmission property of a CDMA (code division multiple access) base station, and more particularly, to an apparatus and method for measuring output power of a pilot channel at the CDMA base station.

2. Description of the Prior Art

In general, CDMA (code division multiple access) refers to a kind of multiple access method, which allows a plurality of users to communicate with each other at the same time and/or frequency in a wireless communication system employed in car phones, cellular (or portable) phones and so forth.

The CDMA system is a spread spectrum communication system, in which information signals are transmitted in a state in which the information signals are subjected to spreading at a wider bandwidth than that of the original information signals. Further, when original data are transmitted, they are subjected to spreading by means of PN (pseudo random noise) codes called spreading codes. Then, when the spread data are received, they are subjected to de-spreading by means of the same PN codes as the PN codes which are used to transmit the spread data, so that the de-spread data are regenerated into the original data. In this CDMA system, there is a near-far problem. This near-far problem is generated in a case, in which, a desired mobile station is far from a shared base station, while an undesired mobile station is near the shared base station. To be more specific, the more distant desired mobile station receives weaker signals than interference signals due to interference with the less distant undesired mobile station in spite of de-spreading, so that it is impossible for the desired mobile station to perform demodulation. Consequently, the more distant desired mobile station has difficulty in performing communication due to such interference. In order to solve the near-far problem, it is necessary to precisely control the transmission power in such a manner that the less distant mobile station is operated with a lower transmission power, but the more distant mobile station is operated with a higher transmission power.

Meanwhile, communication between a base station and at least one mobile station within the base station is performed through forward and reverse links, in which the forward links are to transmit signals from the base station to the mobile station, while the reverse links are to transmit signals from the mobile station to the base station.

Further, each forward link established from the base station to the mobile station is made up of three types of overhead channels, i.e., a pilot channel, a synchronous channel and a paging channel in an idle state, but it is made up of four types of channels, including another type of overhead channel, i.e., a traffic channel in a busy state.

Therefore, the total transmission output power of the base station encounters a rapid change according to various parameters related to the traffic channels. For this reason, it is difficult to measure accurate transmission output power. In order to solve this problem as well as accurately measure property and error of the transmission output power of the base station, either output power of the pilot, synchronous and paging channels, or output power of only the pilot channel should be measured except for output power of the traffic channels as a dynamic parameter.

However, there is a problem in that it is difficult to measure transmission output power of only the pilot channel among the pilot, synchronous, paging and traffic channels, which are received in mixture with one another in the same frequency band.

SUMMARY OF THE INVENTION

The present invention has been made to solve the foregoing problems and it is therefore an object of the present invention to provide an apparatus and method for measuring output power of a pilot channel of a CDMA (code division multiple access) base station, capable of accurately measuring property of transmission output power of the base station by extracting transmission output power of the pilot channel from among dynamically changing transmission output power of the base station.

By the present invention, there is provided an apparatus for measuring transmission output power of a base station in a forward link from the base station to at least one mobile station in a CDMA (code division multiple access) communication system, comprising: an output power level measurement unit for measuring the total output power of the base station; a code domain analyzer for analyzing the total output power of the base station according to each code; and a controller for getting output power of an overhead channel by evaluating a proportion which the overhead channel accounts for with respect to all code domains analyzed by the code domain analyzer and by multiplying the proportion by the total output power measured by the output power level measurement unit.

By the present invention, there is provided a method for measuring transmission output power of a base station in a forward link from the base station to at least one mobile station in a CDMA (code division multiple access) communication system, comprising the steps of: receiving output power of the base station; measuring the total output power outputted from the base station by means of an output power level measurement unit and at the same time dividing and measuring the output power of the base station in the same time zone according to each code by means of a code domain analyzer; evaluating a proportion which the pilot channel accounts for with respect to the all code domains; and evaluating output power of the pilot channel by multiplying the proportion of the pilot channel by the total output power of the base station.

The proportion which the pilot channel accounts for with respect to all code domains, is measured by a code domain analyzer and at the same time the total transmission output power of all transmission channels are measured, and then the proportion of the pilot channel is multiplied by the total transmission output power, so that the output power of only the pilot channel itself can be measured.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

A preferred embodiment of the invention will be described below in detail with reference to the accompanying drawings.

Figure 1:
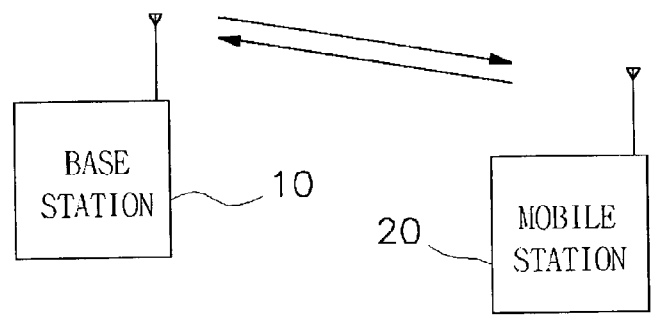
FIG. 1 is a schematic view illustrating communication operation between a base station and a mobile station in a general CDMA communication network.

FIG. 1 is a schematic view illustrating communication operations between a base station and a mobile station in a general CDMA communication network. A forward link or a downlink refers to a transmission path from a base station 10 to at least one mobile station 10, while a reverse link or an uplink refers to a transmission path from the mobile station 20 to the base station 10.

Figure 2:
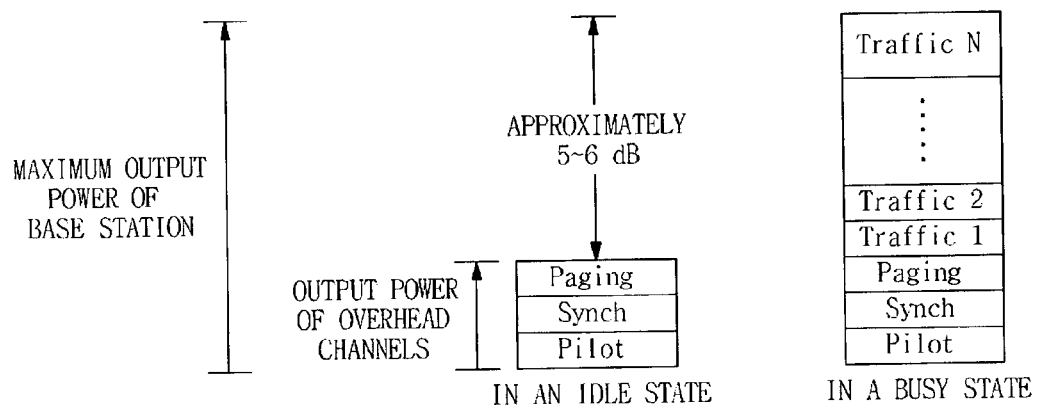
FIG. 2 is a channel structure for transmitting output power of a base station in an idle state and in a busy state.

Referring to FIG. 2, the base station has output power from three types of overhead channels, such as a pilot channel, a synchronous channel and a paging channel in an idle state, but it has output power from four types of overhead channels, such as a pilot channel, a synchronous channel, a paging channel and a traffic channel in a busy state. Here, the four types of channels are allocated to by sixty four (64) channels: one (1) channel for the pilot channel, one (1) channel for the synchronous channel, seven (7) channels for the paging channel, and fifty five (55) channels for the traffic channel. Meanwhile, the number of the traffic channels varies according to the number of users within one serviceable cell which a particular base station takes charge of, so that the total transmission output power of the base station encounters a rapid change as shown in FIG. 3 due to multiple parameters related to the traffic channels.

Figure 3:
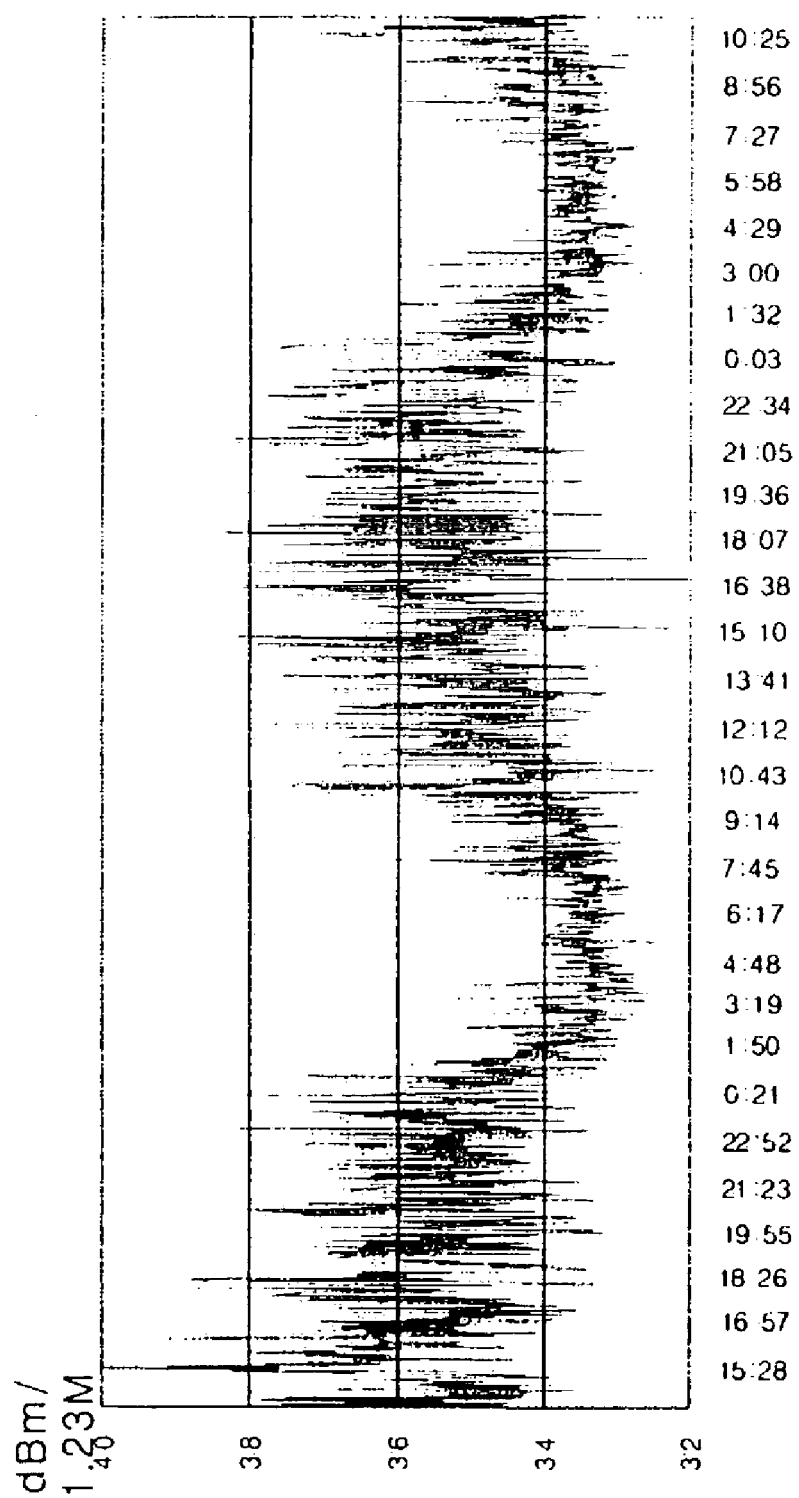
FIG. 3 is a graph showing change of transmission output power in a busy state.

Referring to FIG. 3, the transverse axis represents time, while the longitudinal axis represents the output power level. It can be seen that the output power of the base station is rapidly changed with the lapse of time. In this manner, because the output power of the base station is subjected to a rapid change with the lapse of time, either output power of the pilot, synchronous and paging channels or output power of the pilot channel should be measured except for output power of the traffic channels as a dynamic parameter so as to perform an accurate measurement of the transmission output power of the base station. While a preferred embodiment of the present invention shows one example in which output power of only the pilot channel is measured in order to measure the transmission output power of the base station, the present invention may be similarly applied to measure output power of the other overhead channels, i.e., the synchronous channel and the paging channels.

Figure 4:
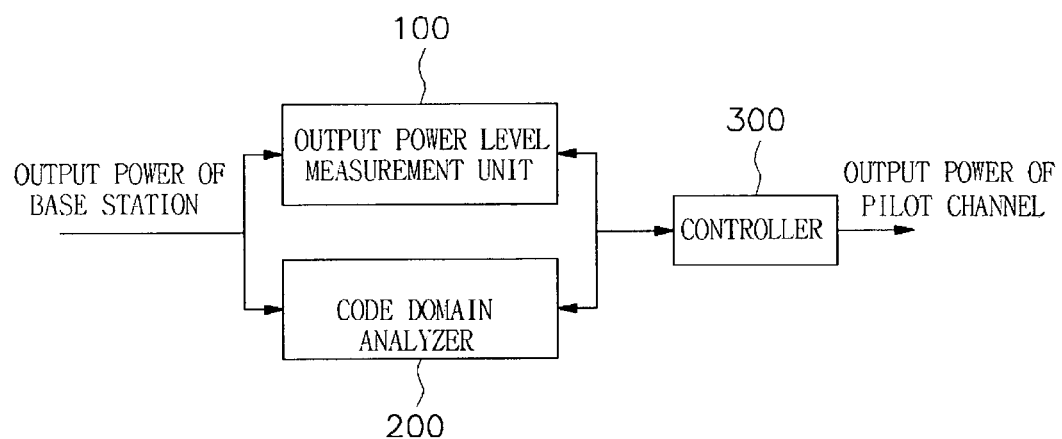
FIG. 4 shows construction for measuring output power of a pilot channel according to the present invention.

FIG. 4 shows construction for measuring output power of a pilot channel according to the present invention.

An apparatus for measuring output power of only the pilot channel according to the present invention includes an output power level measurement unit 100 for measuring the total output power of the base station, a code domain analyzer 200 for analyzing the total output power of the base station according to each of Walsh codes, and a controller 300 for getting output power of only the pilot channel by evaluating a proportion which the pilot channel accounts for out of the total output power analyzed by the code domain analyzer 200 and then by multiplying the proportion by the total output power measured by the output power level measurement unit 100.

Referring to FIG. 4, the output power level measurement unit 100 measures output power outputted from the base station 10 in a busy state, i.e., the total output power summing up output power of the pilot, synchronous, paging and traffic channels. The code domain analyzer 200 evaluates a respective code domain power which each of 64 channels allocated by Walsh codes (denoted $W_j$, for $j=0$ to 63) accounts for, as described below. The controller 300 evaluates a proportion which the pilot channel accounts for out of the total code domain power evaluated by the code domain analyzer 200, receives the total output power measured by the output power level measurement unit 100, multiplies the proportion, which the pilot channel accounts for, by the total output power, and evaluates output power of only the pilot channel as represented below by Equation 1.

Output power of pilot channel=total output power of all channels×proportion of pilot channel    Equation 1

Figure 5:
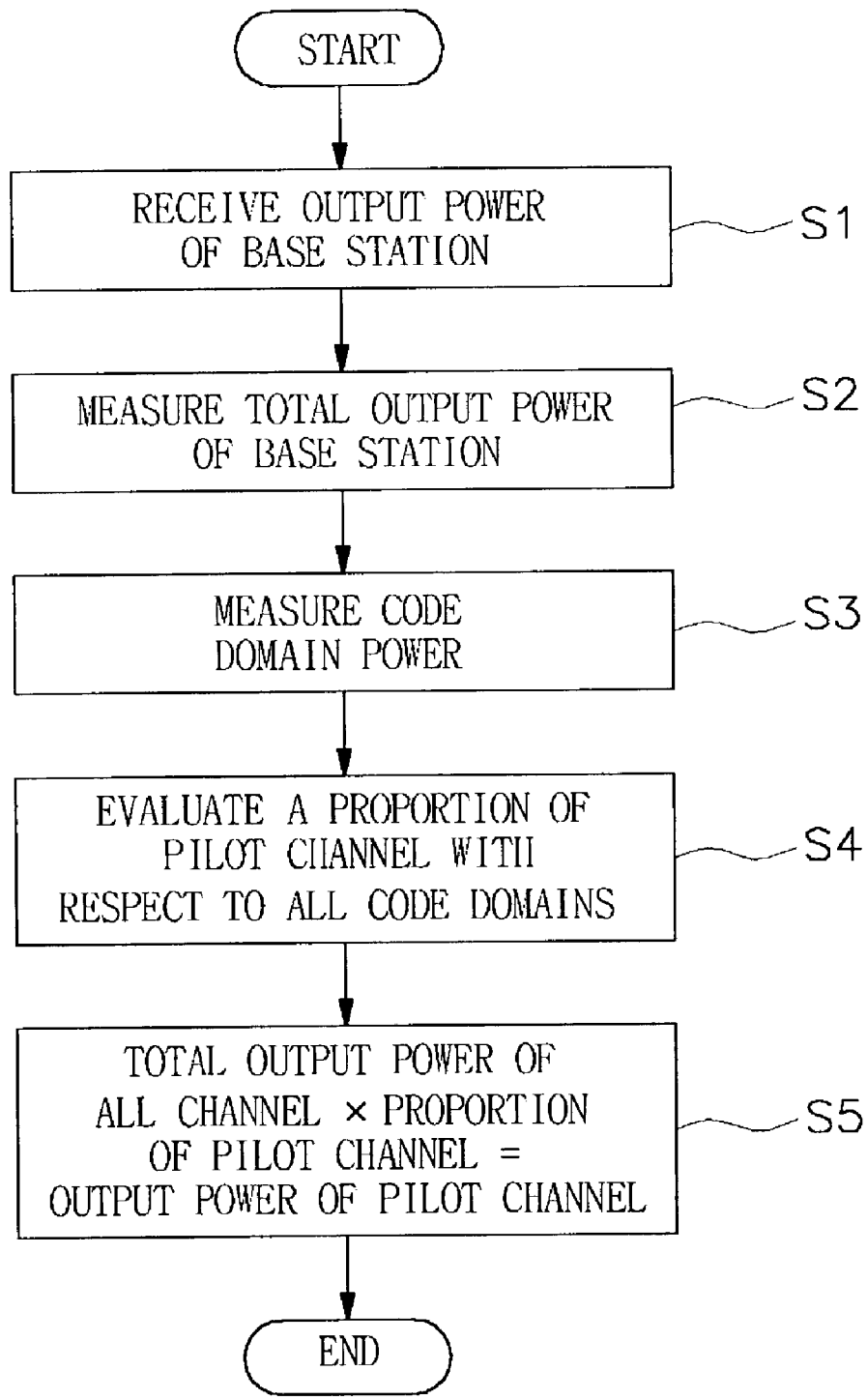
FIG. 5 is a flow chart showing a method for measuring output power of a pilot channel according to the present invention.
Figure 6:
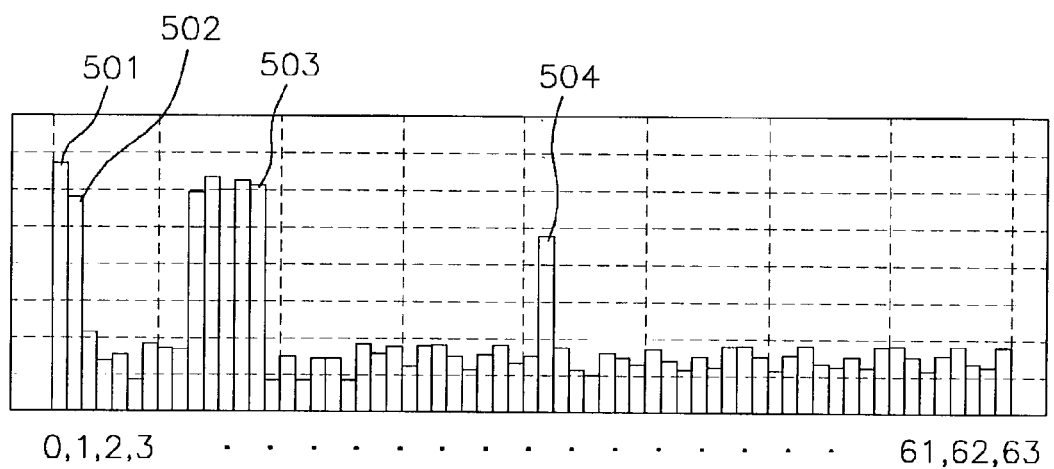
FIG. 6 is a graph showing code domain power of all code domains measured by a code domain analyzer.

FIG. 5 is a flow chart showing a method for measuring output power of a pilot channel according to the present invention, and FIG. 6 shows code domain power measuring code domains according to the present invention.

Referring to FIG. 5, a method for measuring output power of a pilot channel according to the present invention comprises the steps of receiving output power of a base station (Step S1), measuring the total output power outputted from the base station by means of an output power level measurement unit 100 (Step S2) and at the same time dividing and measuring the output power of the base station in the same time zone or period according to each code by means of a code domain analyzer 200 (Step S3), evaluating a proportion which the pilot channel accounts for with respect to all code domains (Step S4), and evaluating output power of only the pilot channel by multiplying the proportion of the pilot channel by the total output power of the base station.

Referring to FIG. 6, an illustration of output power of a base station which is analyzed by a code domain analyzer 200 is shown. The transverse axis represents sixty four channels (denoted by $W_j$, for $j=0$ to 63) classified on the basis of Walsh codes, and the longitudinal axis represents the code domain power level. In FIG. 6, the reference numeral 501 indicates a pilot channel, 502 indicates a paging channel and 504 indicates a synchronous channel. The remaining channels may be used as additional paging and traffic channels, of which the numeral 503 indicates one or more traffic channels in service. The pilot channel has a proportion given by dividing the output power of the pilot channel by the total output power of 64 code domains (or 64 channels).

In this manner, the present invention measures the total transmission output power of all transmission channels and at the same time measures a proportion which the pilot channel accounts for of the total transmission output power by means of the code domain analyzer, and then multiplies the proportion of the pilot channel by the total transmission output power, thus measuring the output power of the pilot channel which is not variable depending on traffic capacity.

As mentioned above, according to the present invention, a proportion, which the pilot channel accounts for out of the total output power of all code domains, is measured by the code domain analyzer, and at the same time, the total transmission output power of all transmission channels is measured. Then the proportion of the pilot channel is multiplied by the total transmission output power, so that output power of only the pilot channel can be measured. Thus, the present invention has an advantage in that reference output power of the base station which does not change depending on traffic capacity is exactly measured, and thereby output power of the base station can be managed in a more precise state.

While the present invention mentioned above has been shown and described in connection with the preferred embodiment, it is intended that the present invention is not limited to the foregoing embodiment but those skilled in the art can make various modifications and variations without departing from the principle of the invention as defined in the appended claims.

What is claimed is:

1. An apparatus for measuring output power of a base station in a forward link from the base station to at least one mobile station in a CDMA (code division multiple access) communication system, comprising:

an output power level measurement unit for measuring the total output power by summing up output power of each channel of the base station;

a code domain analyzer for analyzing the total output power of the base station according to each code and evaluating proportions that each channel accounts for with respect to all code domains; and a controller for getting only the output power of an overhead channel by evaluating a proportion which the overhead channel accounts for with respect to all code domains based on the result analyzed and evaluated by the code domain analyzer and by multiplying the proportion by the total output power measured by the output power level measurement unit.

2. An apparatus according to claim 1, wherein the overhead channel includes at least one of a pilot channel, a synchronous channel and a paging channel.

3. A method for measuring output power of a base station in a forward link from the base station to at least one mobile station in a CDMA (code division multiple access) communication system, comprising steps of:

receiving output power of the base station;

measuring output power from each channel of the base station by means of an output power level measurement unit at the same time and measuring the total output power of the base station by summing up output power of each channel;

dividing and measuring the total output power of the base station in the same time according to each code by means of a code domain analyzer;

evaluating a proportion which a pilot channel accounts for with respect to all code domains; and evaluating output power of the pilot channel by multiplying the proportion of the pilot channel by the total output power of the base station.

* * * * *